United States Patent [19]

Alsup et al.

[11] Patent Number: 5,191,342
[45] Date of Patent: Mar. 2, 1993

[54] FIX-TRACKING SYSTEM

[75] Inventors: James M. Alsup; Edward C. Jelks, both of San Diego, Calif.

[73] Assignee: The United States of America as represented by the Secretary of the Navy, Washington, D.C.

[21] Appl. No.: 292,767

[22] Filed: Aug. 6, 1981

[51] Int. Cl.$^5$ ................................................ G01S 3/02
[52] U.S. Cl. ...................................... 342/465; 342/387
[58] Field of Search ............... 343/453, 465, 387, 389, 343/451, 444; 364/452

[56] References Cited

U.S. PATENT DOCUMENTS

| | | | |
|---|---|---|---|
| 3,445,847 | 5/1960 | Hammack | 343/465 |
| 3,889,266 | 6/1975 | Bartram | 343/465 |
| 4,215,345 | 7/1980 | MacDoran | 343/465 |

Primary Examiner—Theodore M. Blum
Attorney, Agent, or Firm—Harvey Fendelman; Thomas Glenn Keough; John Stan

[57] ABSTRACT

An apparatus determines the location of a signal source having coordinates (x,y). The source may be located as far away as two thousand km and does not require knowledge of ionospheric height or layer structure. The apparatus comprises at least three receivers adapted to receive the signals from the signal source. The coordinates, $(x_1,y_1)$, $(x_2,y_2)$ and $(x_3,y_3)$, of each of the receivers are very precisely known. One receiver is capable of receiving signals from the other two receivers through different means (e.g. a wide-band telephone link). A plurality of at least three timers, one connected to each receiver, measures precisely the time difference of arrival (TDOA) of the signals from the signal source. A plurality of at least three means, connected one to each of the receiving means, determine the vertical angles $\phi$ at which the signal from the signal source is received by each of the receivers. More precisely, each receiver is in reality a phased array of individual antenna elements whose joint output can be used to measure both vertical angle and azimuth. Means are provided for calculating the coordinates (x,y) of the signal source from the measured vertical angles and the time differences of arrival.

2 Claims, 3 Drawing Sheets

FIG. 5 SYSTEM FOR DETERMINING THE LOCATION OF A SIGNAL SOURCE.

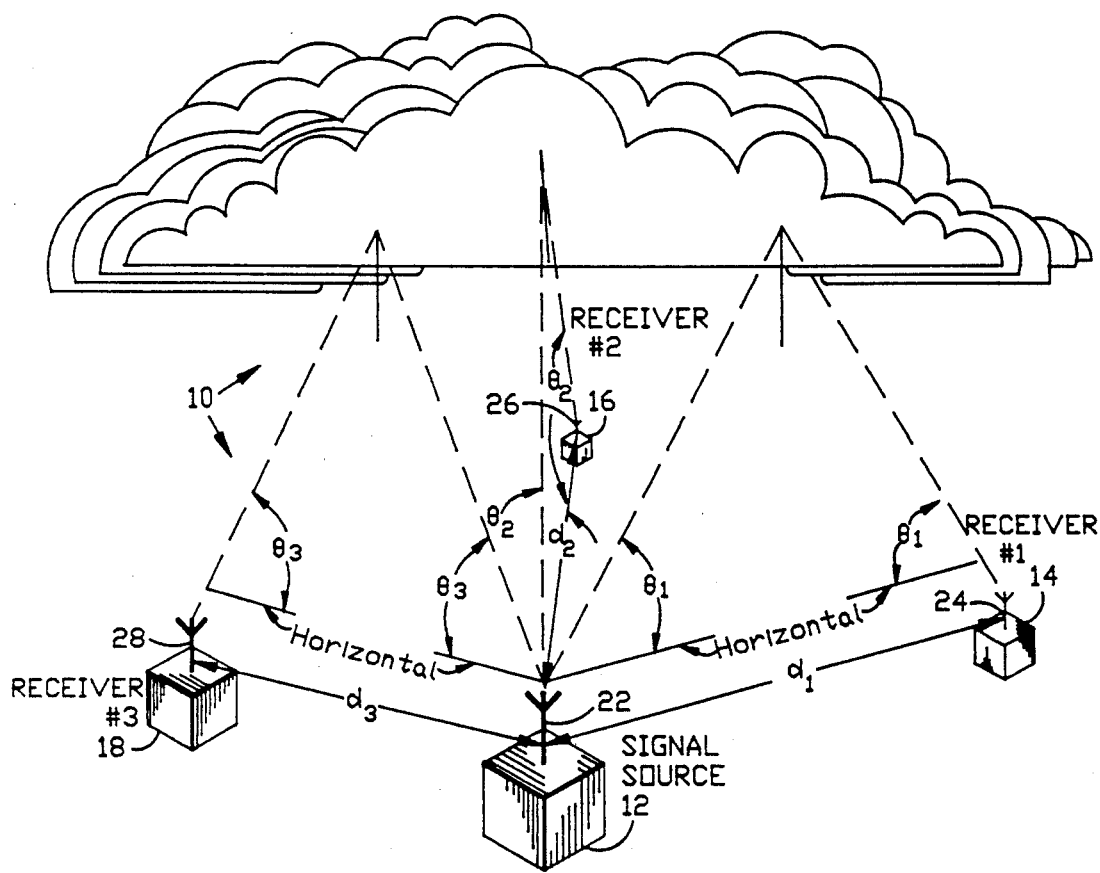
FIG. 1 SPATIAL RELATIONSHIPS OF UNKNOWN SOURCE AND RECEIVERS.
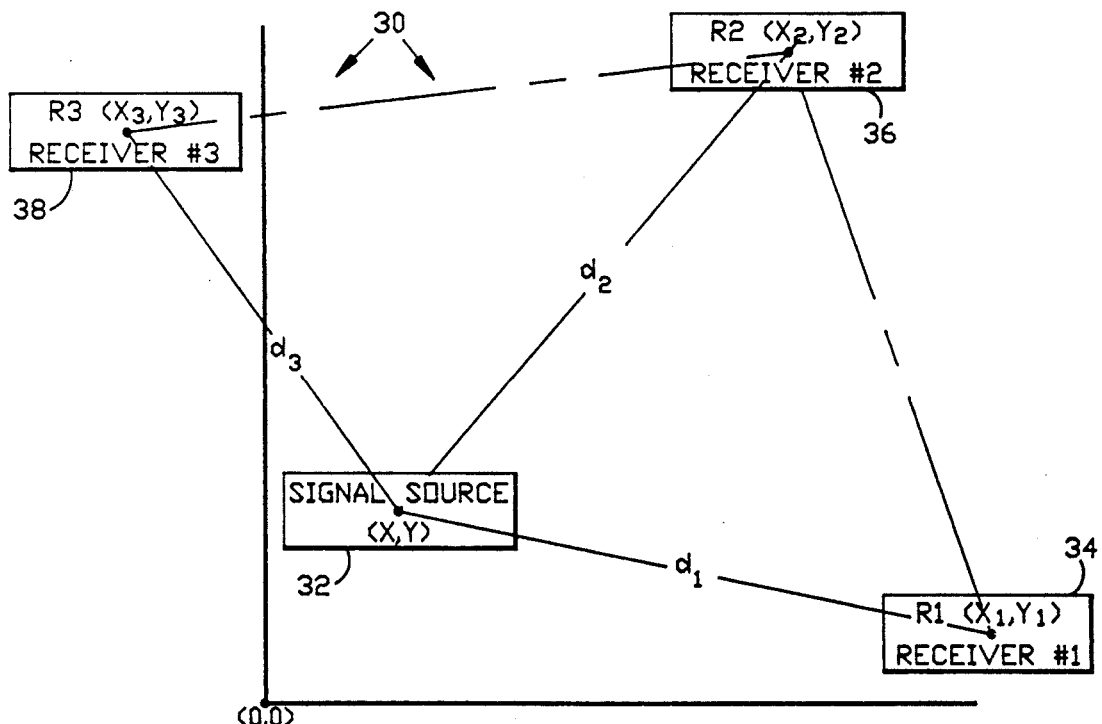
FIG. 2 GENERAL THREE-STATION GEOMETRY AND COORDINATES, FLAT EARTH.

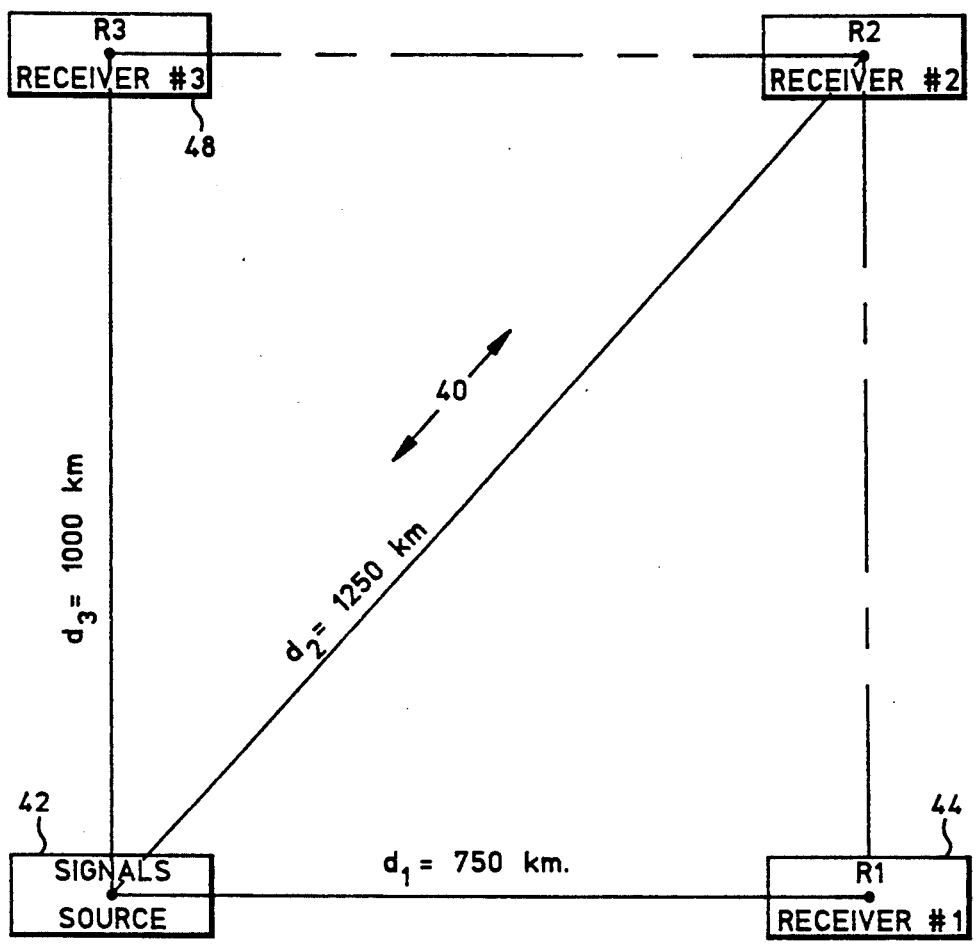
FIG. 3 PARTICULAR THREE-STATION GEOMETRY USED FOR ERROR SENSITIVITY ANALYSIS WITH ASSUMED 400km UNIFORM IONOSPHERIC HEIGHT.
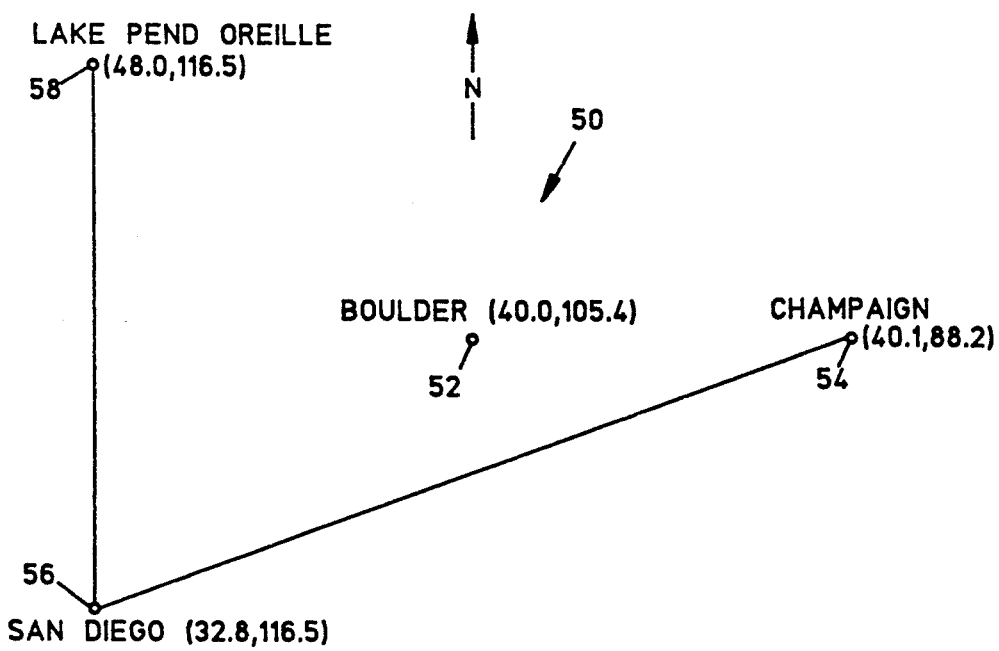
FIG. 4 HFDF SCENARIO FOR SPHERICAL EARTH CALCULATIONS.

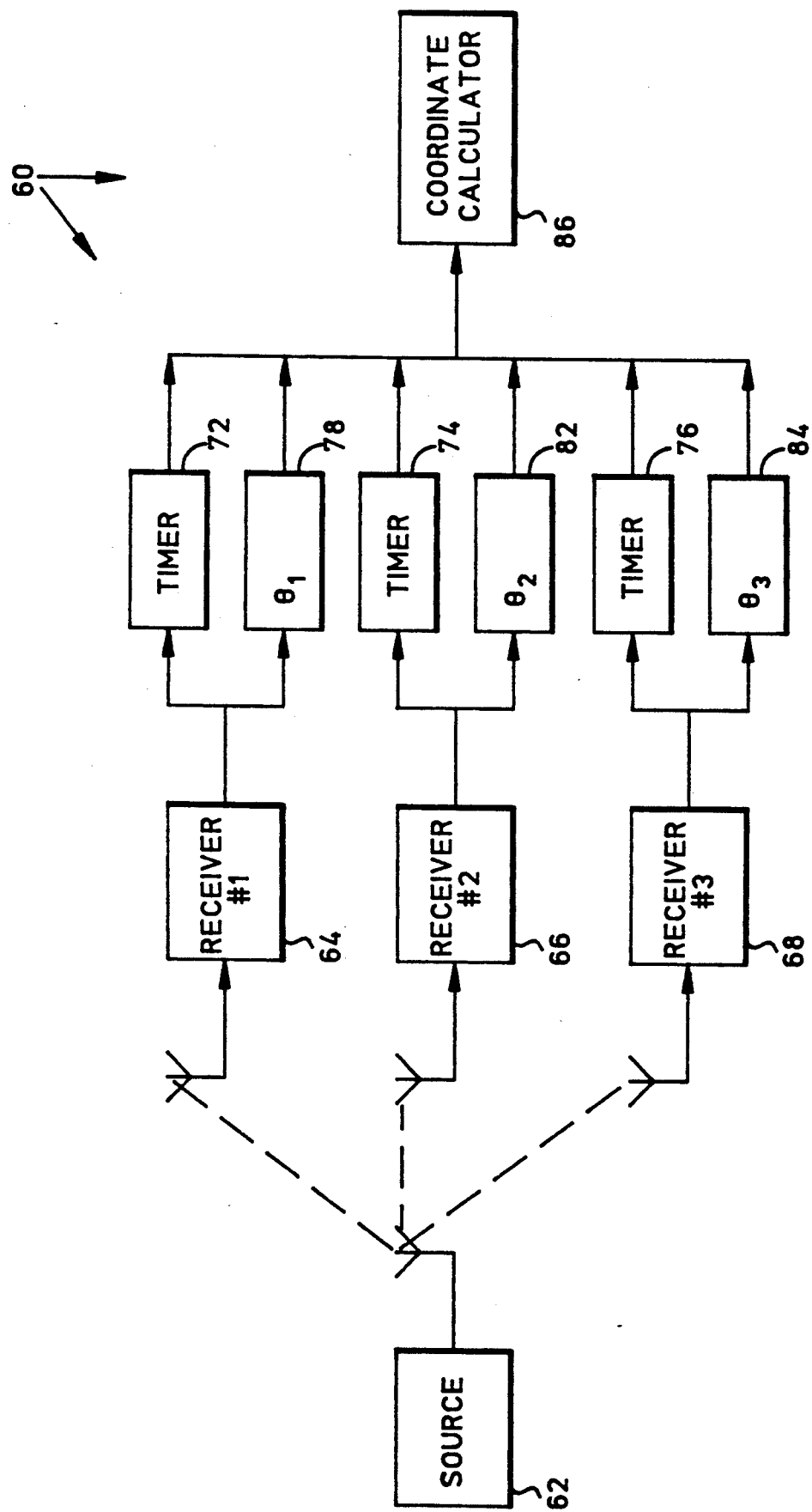
FIG. 5 SYSTEM FOR DETERMINING THE LOCATION OF A SIGNAL SOURCE.

FIX-TRACKING SYSTEM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

One type of emitter-locator system in current use estimates line of bearing from two or more antenna-array receivers to the unknown emitter location, and produces a fix based on the intersection of the bearing lines. This type of system is ultimately limited in accuracy because of the superposition of modes representing multi-hop or multi-layer propagation of the radio signal to and from the ionosphere, each mode appearing at a slightly different bearing and/or time delay.

A second type of emitter locator system uses the measurement of time-difference-of-arrival (TDOA) between modes received at three or more antenna arrays to produce a hyperbolic fix (intersection of two TDOA hyperbolas) of the unknown emitter location.

A third type of emitter locator uses the measurement of vertical angle (VA) at a single receiver site along with the determination of bearing to determine radial distance along a measured line of bearing at which an emitter is located.

These second and third types of system are ultimately limited for ranges exceeding ground-wave propagation (about three hundred miles) by the accuracy to which the ionosphere is measured, that is, the effective height of each layer.

SUMMARY OF THE INVENTION

An apparatus determines the location of a signal source, having coordinates (x,y). The source may be located as far away as two thousand km and the system does not require precise knowledge of ionospheric height or layer structure. The apparatus comprises at least three signal receiving means adapted to receive the signals from the signal source. The coordinates $(x_1,y_1)$ $(x_2,y_2)$ and $(x_3,y_3)$ of each of the receivers are very precisely known. One receiver is capable of receiving signals from the other two receivers via a different propagation mode (e.g. wide-band telephone). A plurality of at least three timers, one connected to each receiver, measures precisely the time difference of arrival (TDOA) of the signals from the signal source. A plurality of at least three means, connected one to each of the receiving means, determine the vertical angles $\phi_i$ at which the signal from the signal source is received by the receivers. Means are provided for calculating the coordinates (x,y) of the signal source from the measured vertical angles and the time differences of arrival.

OBJECTS OF THE INVENTION

An object of the invention is to provide a high-frequency-fix tracking system with improved localization and tracking accuracies Another object of the invention is to provide such a system which allows a position fix to be calculated based upon measurements of vertical angle and time difference of arrival only, and specifically does not depend upon precise knowledge of ionospheric height data.

Yet another object of the invention is to provide a system in which potentially greater accuracy can be realized than the prior art beam-intersection fix techniques.

A further object of the invention is to provide a system which accepts any pure mode, whether multi-hop, single-hop, multi-layer, single-layer, or mixture of the same, as the signal upon which to measure time difference of arrival and vertical angle, and does not require any knowledge of the mode structure.

Other objects, advantages and novel features of the invention will become apparent from the following detailed description of the invention when considered in conjunction with the accompanying drawings.

BRIEF DESCRIPTION OF THE DRAWINGS

FIG. 1 is a perspective view showing the distances between the three or more receivers used and the signal source.

FIG. 2 is a plan view showing the general three-station geometry and coordinates, with a flat earth.

FIG. 3 is a plan view of a particular three-station geometry used for error-sensitivity analysis, with an assumed four hundred-km uniform ionospheric height.

FIG. 4 is a plan view of a high-frequency direction-finding scenario for spherical earth calculations.

FIG. 5 is a block diagram of a system for determining the location of a signal source.

DESCRIPTION OF THE PREFERRED EMBODIMENTS

Referring to FIG. 1, therein is shown a perspective view of a high-frequency direction-finding (HFDF) system 10. The system 10 has the capability of fixing and tracking a high-frequency (HF) radio emitter signal source 12 from long distances, $d_1$, $d_2$ and $d_3$, approximately 1,000–2,000 km. The system 10 comprises three or more receivers, 14, 16 and 18, and associated antenna arrays, 24, 26 and 28. The system 10 measures time difference of arrival (TDOA) and vertical angle (VA), $\phi_1$, $\phi_2$ and $\phi_3$, so as to determine the location of the signal source 12 which is beyond ground wave range. The system 10 does not require precise knowledge of the height of the ionosphere 29 nor its layer structure. The system 10 involves the use of moderately precise measurements of the time difference of arrival and vertical angle in order to provide three-station hyperbolic fixes without requiring information about ionospheric parameters.

Referring now to FIG. 2, therein is shown a system 30, for determining the location of a signal source 32 having coordinates (x,y) which are to be determined by the methods of this invention The coordinates of the minimum of three receivers, 34, 36 and 38, which are required are $(x_1,y_1)$, $(x_2,y_2)$ and $(x_3,y_3)$, the values of the coordinates being known with respect to an origin (0,0).

The equations which enable determination of the coordinates (x,y) of signal source 32 are the following:

$$c\Delta t = \frac{\sqrt{(x-x_1)^2 + (y-y_1)^2}}{\cos\theta_1} - \frac{\sqrt{(x-x_2)^2 + (y-y_2)^2}}{\cos\theta_2} \qquad (1)$$

$$c\Delta t = \frac{\sqrt{(x-x_1)^2 + (y-y_1)^2}}{\cos\theta_1} - \frac{\sqrt{(x-x_3)^2 + (y-y_3)^2}}{\cos\theta_3} \quad (2)$$

In the above equations, the terms under the radicals represent the distances $d_1$, $d_2$ and $d_3$. These distances represent the distances from the signal source 32 to each of the three receivers, 34, 36 and 38, respectively.

In Eqs. (1) and (2), $\Delta t$ is the time difference of arrival, c is the velocity of propagation, and $\theta_1$ and $\theta_2$ are the vertical angles measured at receivers 34 and 36. The vertical angles $\theta_1$ and $\theta_2$ are shown in FIG. 1.

The formulation of Eqs. (1) and (2) assumes a flat earth, zero ionospheric tilt, a constant velocity of propagation, and a specular-reflection model of the ionospheric layer interaction Referring now to the embodiment 40 shown in FIG. 3, calculations have been made on the sensitivity of this configuration to possible errors made in the determination of either $\Delta t$'s (TDOA's) or $\theta$'s (vertical angles measured from the horizontal). In this figure, the actual positions of the source 42 and the three receivers, 44, 46 and 48 are assumed to lie at the corners of a 750 km-by-1000 km rectangle, and the ionospheric height is assumed to be a uniform 400 km. Errors were then calculated for given deviations in $\Delta t$ and $\theta$ from the correct values. With an error in $\Delta t$ of $\pm 10$ $\mu$sec the error in the fix amounted to $\pm 13.2$ km. With an error in $\theta$ of $\pm 2°$, the error in fix amounted to $\pm 5.0$ km.

In addition, error in fix due to an ionospheric tilt of 0.05° was calculated to be $\pm 1.5$ km, worst case. This included "in-line", "lateral", and "mixed" tilts.

It should be noted that the above formulation does not require that the modes measured at the three receiver stations, 44, 46 or 48, be of the same type. Rather, a "mixed bag" of multi-hop, multi-level modes is allowed, so long as the particular mode used at a given station, 44, 46 or 48, is pure, that is, uncontaminated by other modes received at that particular station.

An interesting outfall of this last concept is that as few as two stations can be used to generate a pair of intersecting hyperbolas, given measurements of the vertical angle $\theta$ of two distinct modes at one of the stations along with the two corresponding $\Delta t$'s. However, the hyperbolas will generally intersect at smaller angles, resulting in larger typical errors.

In general, measurement of vertical angle ($\theta_1$, $\theta_2$ and $\theta_3$) is highly desirable. If used in tandem with current azimuth systems, for example the 300 m Wollenweber arrays, the bias errors due to inadequate mode separation could be substantially reduced, if not entirely eliminated. If used in conjunction with time-delay-of-arrival measurements, multipath problems are likewise substantially reduced, and the coherent processing which may be required for $\Delta t$ determination is simplified by the lack of the requirement for inverse or adaptive multipath filtering on the time domain signal.

Measurements of the vertical angles, $\theta_1$, $\theta_2$ and $\theta_3$, FIG. 1, should, however, be performed with adequate resolution and precision so as to (a) provide a pure mode, and (b) interpolate its vertical angle with sufficient accuracy. This requires both a beam-forming operation, with nominal angular resolution of about three-to-five degrees, and a null-steering calculation, with nominal precision of $\pm 1°$. An aperture comparable to the 300-meter Wollenweber is adequate over much, though not all, of the high-frequency range for vertical angles approaching the zenith. However, for angles near the horizontal, an aperture some ten-to-twenty times larger is required. A design of such an antenna should be straightforward, and perhaps even simple when compared with some of the radial-astronomy arrays developed by the National Science Foundation and operated in the southwestern deserts.

FIG. 4 shows the system 50 of this invention with distances and spherical earth parameters, latitudes and longitudes, shown.

The equations used to determine the location of the source 52 with respect to the locations of the three receivers, 54, 56 and 58, are discussed in great detail hereinbelow.

Referring now to FIG. 5, therein is shown a system 60 for determining the location of a signal source 62. It is desired to find the coordinates (x,y) of the signal source 62. The source 62 may be located as far away as 2,000 km from the receivers 64, 66 and 68. The system 60 does not require knowledge or ionospheric height or layer structure.

A plurality of at least three signal receiving means, 64, 66 and 68, are required. The receiving means, 64, 66 and 68, need not be located in a nonlinear relationship with respect to each other. The coordinates $(x_1,y_1)$, $(x_2,y_2)$ and $(x_3,y_3)$ of each of the receivers, 64, 66 and 68, respectively, must be very precisely known. Each of the receiving means, 64, 66 and 68, must be capable of receiving signals from the other two receivers as well as from the signal source 62.

A plurality of at least three measuring means, 72, 74 and 76, having inputs connected to the outputs of the receiving means, 64, 66 and 68, measure precisely the time difference of arrival of the signals from the signal source 62.

A plurality of at least two of the three vertical angle measuring means, 78, 82 or 84, also have their inputs connected to the outputs of the receiving means 64, 66 or 68. The means 78, 82 and 84 measure the vertical angles at which the signal from the signal source 62 is received. As stated hereinabove, each receiver may comprise a phased array which includes a plurality of individual antenna elements.

Finally, a means 86 for calculating coordinates has inputs which are connected to the outputs of the timing means 72, 74 and 76 and to the outputs of the means for measuring vertical angles, 78, 82 and 84.

By utilizing the equations given hereinabove and hereinbelow, the coordinates of the source 62 may be determined.

Some variations of the basic system described hereinabove will now be considered.

In the case that the two heights and mode-types are identical, Eq. (1) for the case of a flat earth reduces to:

$$c\Delta t = \quad (3)$$

$$\alpha\{\sqrt{(x-x_1)^2 + (y-y_1)^2} - \sqrt{(x-x_2)^2 + (y-y_2)^2}\,]$$

$$\text{where } \alpha = \frac{\sin\theta_2 - \sin\theta_1}{\sin(\theta_2 - \theta_1)} \quad (4)$$

Also, in this case a two-station fix can be generated from one time delay of arrival and two vertical angles via the intersection of two circles derived from Eq. (3) and the relation $d_1 \tan\theta_1 = d_2 \tan\theta_2$.

$$(x-x_1)^2+(y-y_1)^2=(\beta_1 c\Delta t)^2 \quad (5)$$

$$(x-x_2)^2+(y-y_2)^2=(\beta_2 c\Delta t)^2 \quad (6)$$

$$\text{where } \beta_1 = \frac{\cos\theta_1 \sin\theta_2}{\sin\theta_2 - \sin\theta_1} \quad (7)$$

$$\beta_2 = \frac{\cos\theta_2 \sin\theta_1}{\sin\theta_2 - \sin\theta_1} \quad (8)$$

This fix will have an associated error about an order of magnitude larger than for the 3-station hyperbolic fix.

Previous results, described hereinabove, in the development of high frequency (HF) processing algorithms for a flat earth are extended hereinbelow to the case of a spherical earth. The primary result is a set of equations which allow a position fix to be calculated based upon measurements of vertical angle (VA) and time difference of arrival (TDOA) only, and specifically do not depend upon precise knowledge of ionospheric height data.

From straightforward geometrical considerations, the following equations may be written:

$$c\Delta t_{21}=2Rw_2-2Rw_1 \quad (9)$$

$$c\Delta t_{23}=2Rw_2-2Rw_3 \quad (10)$$

$$\text{where } w_i = \frac{m_i \sin\phi_i}{\cos(\theta_i + \phi_i)} \quad (11)$$

and $$\phi_i = \frac{1}{2m_i} \cos^{-1}[\sin\alpha \cdot \sin\alpha_i + \cos\alpha \cdot \cos\alpha_i \cdot \cos(\beta - \beta_i)] \quad (12)$$

Other parameters in these equations are defined as follows:

$\phi_i$ = half the angle subtended at the Earth's center by one hop of the "ray" connecting source and the $i^{th}$ receiver $\theta_i$ = vertical angle at the $i^{th}$ receiver $(\alpha_i, \beta_i)$ = (latitude, longitude) of the $i^{th}$ receiver $(\alpha, \beta)$ = (latitude, longitude) of the source (unknown)

$\Delta t_{21}$ = TDOA between receivers #2 and #1

$\Delta t_{23}$ = TDOA between receivers #2 and #3

R = earth's radius at center of receivers (6371.2213 km)

c = velocity of HF wave propagation $m_i$ = number of hops (unilayer mode) to $i^{th}$ receiver Each of the equations (9) and (10) specifies a locus of points $(\alpha, \beta)$ along the spherical earth's surface similar to the hyperbolas, Eqs. (1) and (2), specified for flat earth. The pair of "hyperbolic" equations can be solved for their intersection using a Newton-Raphson type of algorithm. The solution is an iterative one given by the following formula:

$$J(\alpha_{n+1}, \beta_{n+1}) = J(\alpha_n, \beta_n) - J^{-1}(\alpha_n, \beta_n) \cdot Z(\alpha_n, \beta_n) \quad (13)$$

where $Z = (z_1, z_2)$ is a vector pair comprised of the functions $$\left. \begin{array}{l} z_1 = w_2 - w_1 - (c\Delta t_{21}/2 \cdot R) \text{ and} \\ z_2 = w_2 - w_3 - (c\Delta t_{23}/2 \cdot R); \end{array} \right\} \quad (14)$$

and $J(\alpha, \beta)$ is a 2-by-2 matrix of derivatives:

$$\left. \begin{array}{l} J(\alpha,\beta) = \begin{vmatrix} a & b \\ c & d \end{vmatrix}; \\ a = \delta z_1/\delta\alpha,\ b = \delta z_1/\delta\beta,\ c = \delta z_2/\delta\alpha,\ d = \delta z_2/\delta\beta \end{array} \right\} \quad (15)$$

Thus, the procedure for obtaining the desired result (the fix, $(\alpha, \beta)$ of the source) is:

a) Compile receiver coordinates $(\alpha_j, \beta_j)$ for the three or more receivers being utilized, and values for the constants R and c.

b) Measure $\theta_i$ and estimate $m_i$ (vertical angle and number of hops) at each receiver site.

c) Measure TDOA's $\Delta t_{21}$ and $\Delta t_{23}$ between pairs of receivers.

d) Make an initial assumption $(\alpha_0, \beta_0)$ for the location of the source and solve equation (13).

e) Iterate Eq. (13) until the solution converges to the coordinates of the source, $(\alpha, \beta)$.

Such a procedure has recently been implemented as a program on a Univac 1110 computer, and correctly converges to the solution over a wide range of initial assumption.

The scenario of FIG. 4 was devised to illustrate the program. With receivers at Lake Pend Oreille (#1: 48.0,116.5), San Diego (#2: 32.8, 116.5), and Champaign (#3: 40.1,88.2), with a source at Boulder (40.0, 105.4), and with various assumed heights of the ionosphere, the problem could be solved in the preliminary part of the program to obtain the $\theta$'s and $\Delta t$'s corresponding to perfect measurements of same. Then these values of VA and TDOA could be perturbed and used as inputs to the main part of the program to find the solution to Eq. (2) given known deviations in measurement of these parameters.

It has been shown that a spherical earth algorithm using vertical angles and time delays of arrival does exist and does lend itself to computer solution. The algorithm does not depend on ionospheric height(s) along any of the three paths, $d_1$, $d_2$ or $d_3$, from source to receivers, so long as the number of hops for each path is known or can be estimated. Multi-layer modes cannot be easily incorporated into the exact solution, but could contribute only small errors to the exact solution for some scenarios. Though not quite as powerful as the flat-earth solution, the spherical earth solution retains the most important characteristics and significantly reduces the amount by which the fix is dependent upon precise knowledge or modelling of the ionosphere. Some care must be taken in the measurement of time delay of arrival and vertical angle to insure that required tolerances in the estimation of these parameters are maintained. It is especially in the area of measuring VA with adequate accuracy that the method will depend, since it is expected that restrictions on the horizontal and vertical extent of the required receiving arrays will make this difficult.

Obviously, many modifications and variations of the present invention are possible in the light of the above teachings. It is therefore to be understood that within the scope of the appended claims the invention may be practiced otherwise than as specifically described.

What is claimed is:

1. System for determining the location of a signal source having coordinates (x,y), which are to be determined, and which may be located as far away as 2000 km, the system not requiring knowledge of ionospheric height or layer structure, comprising:

a plurality of at least three signal receiving means, adapted to receive the signals from the signal source, the receiving means being located in a non-colinear relationship with respect to each other, however, the coordinates $(x_1,y_1)$, $(x_2,y_2)$ and $(x_3,y_3)$ of each of the receivers being very precisely known, each means for receiving being capable of receiving signals from the other two receivers;

a plurality of at least three measuring means, one connected to each receiving means, for measuring precisely the time difference of arrival (TDOA) of the signals from the signal source;

a plurality of at least two means, connected to at least two of the receiving means, for determining the vertical angle $\theta_i$, i=1, 2 or 3, at which the signal from the signal source is received by the receivers; and means for calculating the coordinates (x,y) of the signal source from the measured vertical angles and the time delays of arrival.

2. A method for determining the location of a distant signal source having coordinates (x,y), which are to be determined, the method not requiring knowledge of ionospheric height or layer structure, the method comprising the steps of:

placing three signal-receiving means in a non-colinear relationship with each other and at distances apart from each other which are of the same order of magnitude as the assumed distance from the signal source to any of the receiving means, the earth coordinates, latitude and longitude, of the three receiving means being known, each receiving means being capable of receiving signals from the other two receivers;

determining the values of R, the earth's radius at the center of the receivers;

measuring $\theta_i$, i=two of the values 1, 2 or 3, the vertical angle at each means for receiving;

estimating $m_i$, i=1, 2 and 3, the number of hops at the site of each receiving means;

measuring the time delays of arrival, $\Delta t_{21}$ and $\Delta t_{23}$ between pairs of the receiving means;

making an initial assumption for the earth coordinates, $\alpha_0, \beta_0$, of the signal source; solving the equation $$J(\alpha_{n+1}, \beta_{n+1}) = J(\alpha_n, \beta_n) - J^{-1}(\alpha_n, \beta_n) \cdot Z(\alpha_n, \beta_n)$$

where $Z=(z_1,z_2)$ is a vector pair comprised of the functions $$z_1 = w_2 - w_1 - (c\Delta t_{21}/2 \cdot R) \text{ and}$$

$$z_2 = w_2 - w_3 - (c\Delta t_{23}/2 \cdot R), \text{ and}$$

$J(\alpha,\beta)$ is a 2-by-2 matrix of derivatives:

$$J(\alpha,\beta) = \begin{vmatrix} a & b \\ c & d \end{vmatrix},$$

$a = \delta z_1/\delta \alpha, b = \delta z_1/\delta \beta, c = \delta z_2/\delta \alpha, d = \delta z_2/\delta \beta;$ and iterating the above mentioned equation until the solution converges to the earth coordinates of the source, $(\alpha,\beta)$.

* * * * *